US008209768B2

(12) United States Patent
Sulzbach et al.

(10) Patent No.: US 8,209,768 B2
(45) Date of Patent: Jun. 26, 2012

(54) METHOD OF MANUFACTURING AN SPM PROBE WITH A SCANNING TIP AND WITH AN ALIGNMENT AID LOCATED OPPOSITE THE SCANNING TIP

(75) Inventors: Thomas Sulzbach, Weisendorf (DE); Oliver Krause, Erlangen (DE); Mathieu Burri, Erlach (CH); Manfred Detterbeck, Kreuzlingen (CH); Bernd Irmer, München (DE); Christian Penzkofer, München (DE)

(73) Assignee: NanoWorld AG, Neuchâtel (CH)

( * ) Notice: Subject to any disclaimer, the term of this patent is extended or adjusted under 35 U.S.C. 154(b) by 283 days.

(21) Appl. No.: 12/576,326

(22) Filed: Oct. 9, 2009

(65) Prior Publication Data
US 2010/0095409 A1 Apr. 15, 2010

(30) Foreign Application Priority Data

Oct. 11, 2008 (EP) ..................................... 08017867

(51) Int. Cl.
*G01Q 70/00* (2010.01)
(52) U.S. Cl. ..................... 850/52; 850/3; 850/5; 850/10; 850/15; 850/21; 850/60; 250/310; 250/306; 250/234
(58) Field of Classification Search .................. 850/3, 5, 850/10, 15, 21, 52, 60; 250/310, 306, 234
See application file for complete search history.

(56) References Cited

U.S. PATENT DOCUMENTS

| | | | |
|---|---|---|---|
| 5,272,913 A | 12/1993 | Toda et al. | |
| 5,883,387 A | 3/1999 | Matsuyama et al. | |
| 7,808,628 B1 * | 10/2010 | Wade | 356/153 |
| 2005/0269495 A1 * | 12/2005 | Kakemizu | 250/234 |

FOREIGN PATENT DOCUMENTS

| | | |
|---|---|---|
| DE | 41 26 151 | 3/1992 |
| EP | 0 394 962 | 10/1990 |
| JP | 09-204898 | 8/1997 |
| JP | 10-123154 | 5/1998 |
| JP | 2003-315238 | 11/2003 |

OTHER PUBLICATIONS

Gerhard Wahrig, "Deutsches Wörterbuch", 1997, Bertelsmann Lexikon Verlag GMBH, Gütersloh, XP002526308.
European Search Report for corresponding Application No. EP 08 01 7867 dated May 4, 2009.

* cited by examiner

*Primary Examiner* — Jack Berman
*Assistant Examiner* — Meenakshi Sahu
(74) *Attorney, Agent, or Firm* — Renner, Otto, Boisselle & Sklar, LLP

(57) ABSTRACT

A method of manufacturing an SPM probe having a support element, a cantilever, and a scanning tip on an underside of the cantilever, and having a mark located on the top side of the cantilever opposite the scanning tip. The mark on the top side of the cantilever is located exactly opposite the scanning tip on the underside of the cantilever. This makes it possible to identify the exact position of the scanning tip in the scanning probe microscope from the upward-pointing top side of the cantilever, which significantly simplifies the alignment of the SPM probe. The support element with the cantilever may be prefabricated conventionally and the scanning tip and the mark are then produced on the cantilever in a self-aligning way by means of a particle-beam-induced material deposition based on a gas-induced process.

9 Claims, 2 Drawing Sheets

METHOD OF MANUFACTURING AN SPM PROBE WITH A SCANNING TIP AND WITH AN ALIGNMENT AID LOCATED OPPOSITE THE SCANNING TIP

CROSS-REFERENCE TO RELATED APPLICATION

The present application claims priority under 35 USC §119 to European Patent Application No. 08 017 867.6 filed on Oct. 11, 2008, the entire disclosure of which is incorporated herein by reference.

TECHNICAL FIELD OF THE INVENTION

The invention concerns a method of manufacturing an SPM probe that comprises a support element, a cantilever, a scanning tip, and a mark in the form of a raised area located on the side of the cantilever opposite the scanning tip, where the mark positively identifies the position of the scanning tip.

DESCRIPTION OF THE RELATED ART

SPM probes are generally known in a wide variety of embodiments and are used in conjunction with scanning probe microscopes for high-resolution scanning of the surface of probes [sic]. Commonly used SPM probes have a cantilever that has at its one end a support element for fixing the SPM probe to a support device of the scanning probe microscope, with a sensitive scanning tip for scanning the sample protruding from its other end on the underside associated with the sample, In scanning probe microscopy, the scanning tip is placed close enough to the surface of the sample to be examined for the probe to interact with the surface to be examined. Due to the forces acting between the scanning tip and the surface, the cantilever of the SPM probe is deflected, and this deflection is detected. Scanning probe microscopy (SPM) has developed into an established technique for surface analysis that permits, among others, the imaging of surface topographies with a resolution of a few nanometers, even down into the atomic range.

An essential core element of this technology is the scanning probe. The nature and the quality of the probes contribute decisively to the achievable resolution of the surface analysis. The resolution is essentially determined by the geometry of the cantilever and by the scanning tip formed on the support element. For the manufacture of the probes, different methods have been established that are based either on the etching of monocrystalline silicon or on thin layers, preferably consisting of silicon nitride.

The scanning tip at the free end of the cantilever, with the form and the radius of curvature of the tip being essential contributions to the quality of the image, is usually made by etching from a solid material (usually monocrystalline silicon) or by means of forming techniques (silicon nitride), with a higher quality of the scanning tip (small radius of curvature, high aspect ratio, large tip height) being achievable by means of etching techniques.

However, another method employs focused beams of charged particles (electron or ion beams) for optimizing the shape of the scanning tip for specific applications. Established techniques in this category are the controlled abrasion of tip material by means of a focused ion beam (FIB) and the local deposition of material by means of electron beam induced deposition (EBID); however, the deposition by means of ion beam induced deposition and the abrasion by means of electron beams are also common.

Compared with the forming techniques based on thin layer technology, as described for example in DE 41 26 151 C2, the technique for manufacturing scanning tips by means of etching from monocrystalline silicon and the technique for producing scanning tips by means of local deposition of material offer significant advantages. With the etching technology, due to the monocrystalline structure of the scanning tip and the cantilever, intrinsic material stresses and bending of the cantilever resulting from these stresses are excluded. With depositions of thin layers, such stresses can never be avoided completely, and minimizing the resulting bending of the cantilever represents the greatest problem in this forming technology. In addition, the aspect ratio of the etched silicon scanning tips is usually larger, and therefore better, than that of the formed scanning tips.

Regarding small high-frequency cantilevers where the size of the scanning tip must be reduced, the etching technology also offers advantages. Because the lithographically defined masking is undercut with this technology, it is possible to produce, with a limited resolution of the lithography, smaller scanning tips than with the forming technology where the resolution of the lithography limits the base dimension of the scanning tip, and therefore its minimum size.

The advantage offered by focused particle beams for optimizing the scanning tips of SPM probes also applies to SPM probes with cantilevers of monocrystalline silicon and with cantilevers made of thin layers, for example silicon oxide or silicon nitride. This method offers special advantages, however, for producing very small cantilevers that will be needed for a future generation of scanning probe microscopes with distinctly higher scanning speed and cantilever lengths of less than 50 µm, typically even less than 10 µm. Because with these cantilevers, too, the mass of the scanning tip needs to be significantly lower than the mass of the actual cantilever in order to avoid a negative effect on the oscillation characteristics, an appropriately small scanning tip height is necessary whose realization and precise positioning on the cantilever can hardly be achieved with conventional methods. With focused particle beams, on the other hand, structures in a magnitude of 10 µm can be realized which makes a positioning accuracy of a few nanometers achievable by means of a controlled electrical and magnetic deflection of the particle beam.

With scanning tunnel microscopy as well as scanning force microscopy it may happen that the scanning tip of the SPM probe becomes worn or damaged when scanning the sample surface, necessitating the replacement of the SPM probe. When replacing the probe, the new scanning tip must be positioned in the exact location of the damaged scanning tip in order to be able to continue the interrupted scanning process at the exact location where it was discontinued. This requires high precision in aligning the newly inserted probe. However, the precise alignment of the cantilever with the attached scanning tip is difficult due to the fact that the scanning tip is concealed by the cantilever. A mark on the top side of the cantilever located exactly opposite the concealed scanning tip would be helpful, and therefore desirable, as an alignment aid for the precise alignment of the cantilever and in particular the scanning tip.

SPM probes with markings as alignment aids are known from the prior art. The patent documents EP 0 394 962 A, JP 10 123 154 A, U.S. Pat. No. 5,883,387 A, JP 2003-315 238 A, and JP 09-204 898 A are referred to as examples.

EP 0 394 962 A discloses a scanning force microscope with an optical observation system that permits the observation of the sample surface and of the free end section of the cantilever of the SPM probe used here. On the side of the cantilever facing away from the sample, the end section has a raised mark that corresponds exactly to the position of the scanning tip of the probe and can be used for positioning the scanning tip. The mark contains a material that was deposited on the free end section.

From JP 10 123 154 A, an SPM probe is known with a scanning tip and a mark on the side of the cantilever that is opposite the scanning tip, with the mark associated with the exact location of the scanning tip. The mark consists of a spherical-cap shaped indentation.

U.S. Pat. No. 5,883,387 A teaches a typical SPM probe with a mark in the shape of an indentation as well as the associated manufacturing method. The cantilever and the scanning tip are made of different materials, with the scanning tip passing through the cantilever and carrying the mark.

JP 2003-315 238 A and JP 09-204 898 A relate to additional embodiments of SPM probes where the cantilever has a mark on its top side that identifies the position of the scanning tip. JP 2003-315 238 A discloses a mark in the shape of an indentation or a raised area that is produced directly on the top side of the cantilever by means of etching techniques. JP 09-204 898 A discloses a cantilever where the scanning tip has the form of a hollow tip that is open towards the top side of the cantilever.

Such a mark for locating the scanning tip significantly simplifies and accelerates the finding of very small structures that are to be examined. The precise knowledge of the position of the scanning tip makes it possible to avoid the scanning of large areas of the sample surface for the purpose of locating the examination area of interest and the considerable abrasion of the tip that this would involve. The object to be examined can be approached directly with high precision and can then be examined with a scanning tip still retaining its original quality.

SUMMARY OF THE INVENTION

Based on the prior art referred to above, the invention addresses the problem of proposing a method for manufacturing the scanning tip and the mark in any type of material. The scanning tip and the mark are to be produced simultaneously or successively on the underside and the top side, respectively, of the cantilever in precise alignment with each other.

On the side of the cantilever that is opposite the scanning tip, the SPM probe manufactured by means of the method according to the invention has a mark that positively identifies the position of the scanning tip. In the following, the side of the cantilever facing away from the scanning tip will be referred to as the top side, and the side of the cantilever associated with the sample will be referred to as the underside of the cantilever. The mark for visualizing the position of the scanning tip on the top side of the cantilever consists of a raised area of the cantilever, with the scanning tip and the mark having been grown on the cantilever as depositions of material by means of focused particle beams, with both consisting of an identical material. Advantageously, the scanning tip and the mark are produced in a joint process step in a self-aligning manner.

The SPM probe described above can be produced in a simple way by means of the method according to the invention that is described below. The support element with the cantilever is prefabricated in a conventional way known to a person skilled in the art, and the scanning tip and the mark are then produced on the cantilever by means of particle beam induced material deposition based on a gas-induced process. As particle beam, an electron beam or an ion beam can be used. Preferably, the scanning tip and the mark are produced in a self-aligning manner in that the particle beam impacts the cantilever orthogonally to the underside and/or the top side, with the alignment of the particle beam relative to the cantilever remaining unchanged during the manufacture of the scanning tip and of the mark. For the scanning tip and the mark, material that is identical with, or different from that of the cantilever can be used.

According to a preferred implementation of the method of forming the scanning tip and the mark according to the invention, a probe consisting of a support element and a cantilever is first produced by means of conventional methods. Then, a particle beam, preferably an electron beam, is focused on the cantilever. The power of the beam and the focal plane are selected so that a local layer growth from the gas phase, induced by scattered secondary particles, takes place preferably on the top side of the cantilever, with a mark forming as a result. After that, the beam power and the focal plane are changed in such a way that the deposition takes place preferably on the underside of the cantilever, with a suitable scanning tip forming as a result. During the adjustment of the beam parameters, the lateral position of the beam on the cantilever remains unchanged so that the lateral position of the mark is in precise agreement with that of the scanning tip.

The new process describes the method of manufacturing an SPM probe where the cantilever is made of a first material, for example of silicon, silicon dioxide, or silicon nitride as is common, and where the scanning tip and the mark are produced in the form of material deposition by means of focused particle beams. According to the invention, in the course of the production method according to the invention, the manufacture proceeds with the following process steps:

Provision of an SPM probe made by means of a conventional method, with a support element and a cantilever without a scanning tip and mark attached to the same;

Start of a local particle-beam-induced material deposition on the cantilever, based on a gas-induced process, with the particle beam, preferably an electron beam, being directed at that location on the underside of the cantilever in which the scanning tip is to be formed;

Selection of the beam parameters of the particle beam so that the deposition of material for the mark takes place preferably on the top side of the cantilever through forward-scattered secondary particles; and Change of the beam parameters of the particle beam so that the deposition of material for the scanning tip takes place preferably on the underside of the cantilever, and precisely opposite the mark, through backward-scattered secondary particles.

Below, the invention is explained in detail with reference to an SPM probe shown in the drawing and to an associated method, shown in the drawing, for manufacturing the SPM probe. Additional characteristics of the invention follow from the description below of the implementations of the invention in conjunction with the claims and the attached drawing.

DETAILED DESCRIPTION OF THE INVENTION

Figure 1:
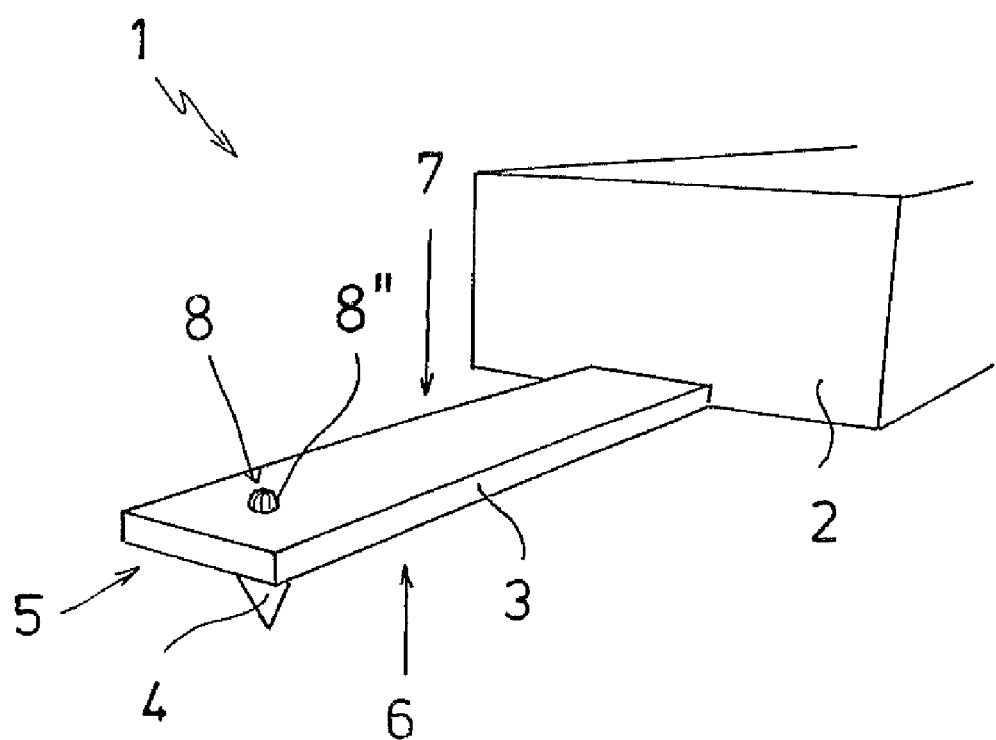
FIG. 1 shows a perspective view of a probe made with the method according to the invention.
Figure 2:
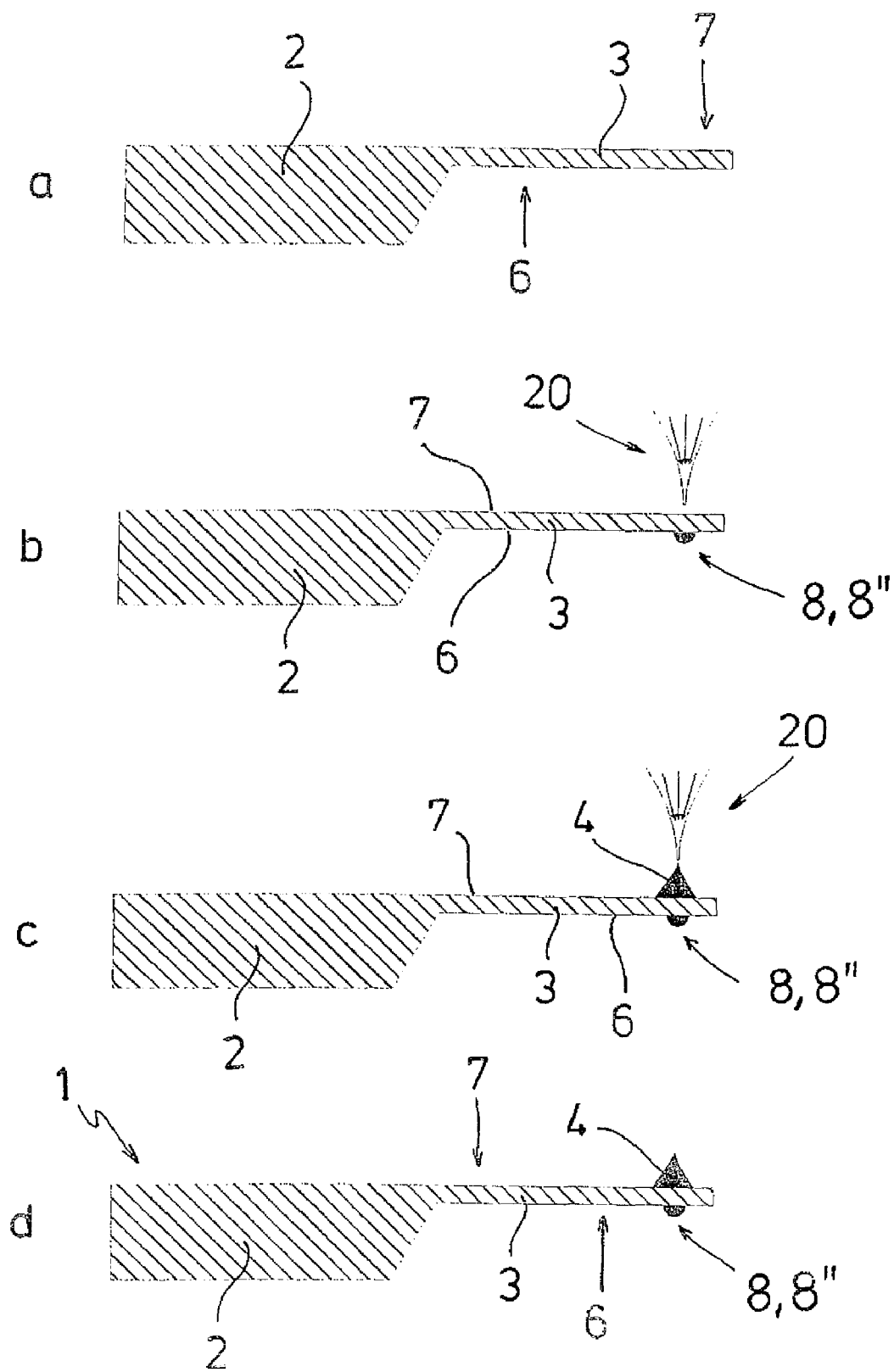
FIG. 2 shows a schematic view of the manufacturing steps (FIG. 2a-2d) of the SPM probe in FIG. 1.

FIG. 1 shows an SPM probe 1 made by means of the method according to the invention, with a support element 2, a cantilever 3, and a scanning tip 4. The scanning tip 4 is located at the free end 5 of the cantilever 3 on the underside 6 that is associated with a sample (not shown). On a top side 7 of the cantilever 3 that is opposite the underside 6, a mark 8 is formed whose position is in exact agreement with the position of the scanning tip 4. The mark 8 consists of a raised area 8" that has been made with gas-induced material deposition by means of a focused particle beam. FIG. 2 shows the essential manufacturing steps of the SPM probe 1 shown in FIG. 1.

FIG. 2, in FIGS. 2a through 2d, shows the sequence of the method according to the invention for the manufacture of the SPM probe 1 according to the invention shown in FIG. 2, where the cantilever 3 is made of a first material, and where the scanning tip 4 as well as the mark 8 in the form of the raised area 8" are made with gas-induced material deposition by means of a focused particle beam. For the scanning tip 4 and the mark 8, the first material or some other suitable material may be used.

The production of the SPM probe 1 starts with an SPM probe 1 according to FIG. 2a that comprises only a support element 2 and a cantilever 3 and is made by means of a conventional method. The manufacture of the scanning tip 4 on the underside 6 of the cantilever 3 and of the raised mark 8 on the top side 7 of the cantilever 3 is accomplished by particle-beam-induced material deposition based on a gas-induced process. For this purpose, a particle beam 20, as shown in FIGS. 2b, 2c, is directed orthogonally to the underside 6 of the cantilever 3 and is focused on the cantilever 3. First, the focal plane and the beam power are selected so that a preferred local layer growth from the gas phase, as can be seen in FIG. 2b, takes place—induced by forward-scattered secondary particles—on the top side 7 of the cantilever 3, thereby first creating the mark 8 in the form of the raised area 8".

Then, the beam power and the beam energy are altered so that, as FIG. 2c shows, the deposition of material takes place preferably on the underside 6 of the cantilever 3 by means of backward-scattered secondary particles, thereby building the scanning tip 4. When the beam parameters are adjusted, the alignment of the particle beam 20 remains unchanged so that the position of the mark 8 and of the scanning tip 4 are in exact agreement in the completed SPM probe 1 shown in FIG. 2d.

The invention claimed is:

1. A method of manufacturing an SPM probe with a support element, a cantilever, a scanning tip, and a mark in the form of a raised area located on the side of the cantilever opposite the scanning tip, where the mark positively identifies the position of the scanning tip, comprising:
    prefabricating the support element with the cantilever, and
    subsequently focusing a particle beam on the cantilever to produce the scanning tip and the mark in self-aligning manner on the cantilever by means of particle-beam-induced material deposition based on a gas-induced process.

2. A method according to claim 1, wherein material identical with that of the cantilever is used as material for the deposition of the scanning tip and of the mark.

3. A method according to claim 1, wherein material different from that of the cantilever is used as material for the deposition of the scanning tip and of the mark.

4. A method according to claim 1, comprised of the following steps:
    (A) Provision of an SPM probe with a support element and a cantilever attached to it without a scanning tip and mark;
    (B) Start of a local particle-beam-induced material deposition on the cantilever, based on a gas-induced process, with the particle beam, being directed at that location on the underside of the cantilever in which the scanning tip is to be formed;
    (C) Selection of the beam parameters of the particle beam so that the deposition of material for a mark takes place on the top side of the cantilever through forward-scattered secondary particles;
    (D) Change of the beam parameters of the particle beam so that the deposition of material for the scanning tip takes place on the underside of the cantilever, and precisely opposite the mark, through backward-scattered secondary particles.

5. A method according to claim 4, wherein essentially the beam parameters of beam power and focal plane of the particle beam are used to determine the location of the preferred deposition of material.

6. A method according to claim 4, wherein the particle beam is an electron beam.

7. A method according to claim 1, comprising focusing the particle beam on an underside of the cantilever on which the scanning tip is to be formed to deposit material for the mark on the top side of the cantilever through forward-scattered secondary particles, and to deposit material for the scanning tip on the underside of the cantilever through backward-scattered secondary particles.

8. A method according to claim 7, wherein an alignment of the particle beam remains unchanged during formation of the scanning tip and the mark.

9. A method according to claim 1, wherein an alignment of the particle beam remains unchanged during formation of the scanning tip and the mark.

* * * * *